Jan. 22, 1963 — A. E. GRAY — 3,075,194
UNIT DOCUMENT ORIGINATING MACHINE
Filed Aug. 20, 1959 — 7 Sheets-Sheet 1

INVENTOR
Alvin E. Gray
BY Geoffrey Knight
ATTORNEY

INVENTOR
*Alvin E. Gray*
BY *Geoffrey Knight*
ATTORNEY 3,075,194
UNIT DOCUMENT ORIGINATING MACHINE
Alvin E. Gray, Binghamton, N.Y., assignor to International Business Machines Corporation, New York, N.Y., a corporation of New York
Filed Aug. 20, 1959, Ser. No. 834,989
15 Claims. (Cl. 346—74)

This invention relates to machines for transferring source data from a series of customer identification plates, to a series of accounting or recording cards for central bookkeeping records, or more specifically to machines for processing customer identification plates, by transferring the customer identification plate data, in machine readable code to an accounting card so that these accounting cards become the source-records of the various customer transactions.

One important field of use of this invention would be in the gas retail business. Most of the large oil companies have devised a system in which credit cards or identification plates are issued to customers to be honored by service stations selling their products. The credit card has on it the customer's name, address and account number. When a sales transaction at the service station has been completed, the identification plate or credit card of prior art devices is presented and a sales slip prepared with a stamping device which will print the customer's name, address and account number upon a sales slip. The amount and type of transaction is then entered manually. One copy of the sales slip is then transmitted to the oil company involved. If the oil company uses a record controlled accounting system the information contained on the sales slip must be transferred to a tabulating card. Not only must the transaction information be transferred to a tabulating card, but also the customer's name, address and account number. Expense and likelihood of error are involved in the necessity of preparing entire tabulating cards from the information contained on separate sales records.

A preferred embodiment of this invention consists of a customer identification plate and a magnetic unit document originating machine. Operation of the machine with an identification plate inserted, will produce a magnetic unit document on which the customer identification is recorded in machine readable code, by direct transfer from the customer identification plate. Concurrently with the machine coding of the magnetic unit document, the customer identification plate will print the customer identification on the document for visual observation.

One example of a magnetic unit document which can be used in this invention is one described in copending application Serial No. 823,903 entitled, Magnetic Data Processing by Demer et al. filed of even date herewith and assigned to the assignee of this application.

The application of Demer et al. discloses a method of recording source information in machine readable code, which utilizes a magnetic unit record card bearing accurately positioned and uniformly premagnetized spots. The premagnetized spots are selectively demagnetized in accordance with the code to represent data. The method is particularly suited, for example, for preparing record cards in a retailing business.

The preferred embodiment of a customer identification plate which forms a part of this invention contains two sections of information. One section contains, in raised characters, the customer's name, address and account number, and a second section of the plate contains the same information in a coded form. These two sections of information are separated to form a slot across the width of the identification plate.

The customer identification plate is inserted, without attachment, into a machine which forms a part of this invention. A magnetic unit document such as the one described in the Demer et al. application is then inserted into the machine. Insertion of the magnetic unit document into the machine, places the document through the slot mentioned in the identification plate. The plate and document before operation of the machine, are in planes perpendicular to each other. Operation of the machine causes the customer identification plate to be rocked on an axis through the slot in the plate, to present the section with raised characters and the section containing the coded information to opposite faces of the magnetic unit document. The section of the identification plate containing the coded information forms a magnetic shield described in copending application Serial No. 824,086 entitled Magnetic Data Transferring Device by Cutaia et al. filed of even date herewith. Further operation of the machine will cause certain of the premagnetized marks on the magnetic unit document to be erased. Means are provided in the machine to sense correct registration of the shield of coded information with the premagnetized spots of the magnetic unit document.

It is the object of this invention to provide a customer identification plate for use in a machine for manipulating the same, to generate, at the location of a sale, a magnetic unit record card of the type disclosed in the Demer et al. application, on which the customer identification is recorded in machine readable code, by direct transfer from the customer identification plate.

It is also an object of this invention to provide a magnetic unit document originating machine to generate, at the location of a sale, a magnetic unit record card of the type disclosed in the Demer et al. application, on which the customer's identification is recorded in machine readable code, by direct transfer from a customer identification plate.

One of the advantages of the magnetic unit record is that the coded information can be represented by rather closely packed spots on a smaller area than in punched cards now in commercial use. This however entails an accurate control of the magnetic recording information.

It is accordingly another object of this invention to provide a customer identification plate and a machine for manipulating the same, which are capable of establishing accurate registration of the card having premagnetized spots and the customer identification plate, during the selective demagnetization of the spots on the card.

It is a further object of the invention to provide a customer identification plate and a machine of the type described which will immediately notify the sales person of any misregistration in the machine.

Still another object is to provide a customer identification plate and a machine of the type described which will print the customer identification on the magnetic unit record directly from said plate, concurrently with the selective demagnetization of the magnetic spots on the card.

The foregoing and other objects, features and advantages of the invention will be apparent from the following more particular description of a preferred embodiment of the invention, as illustrated in the accompanying drawings.

Figures 1, 2, 3:
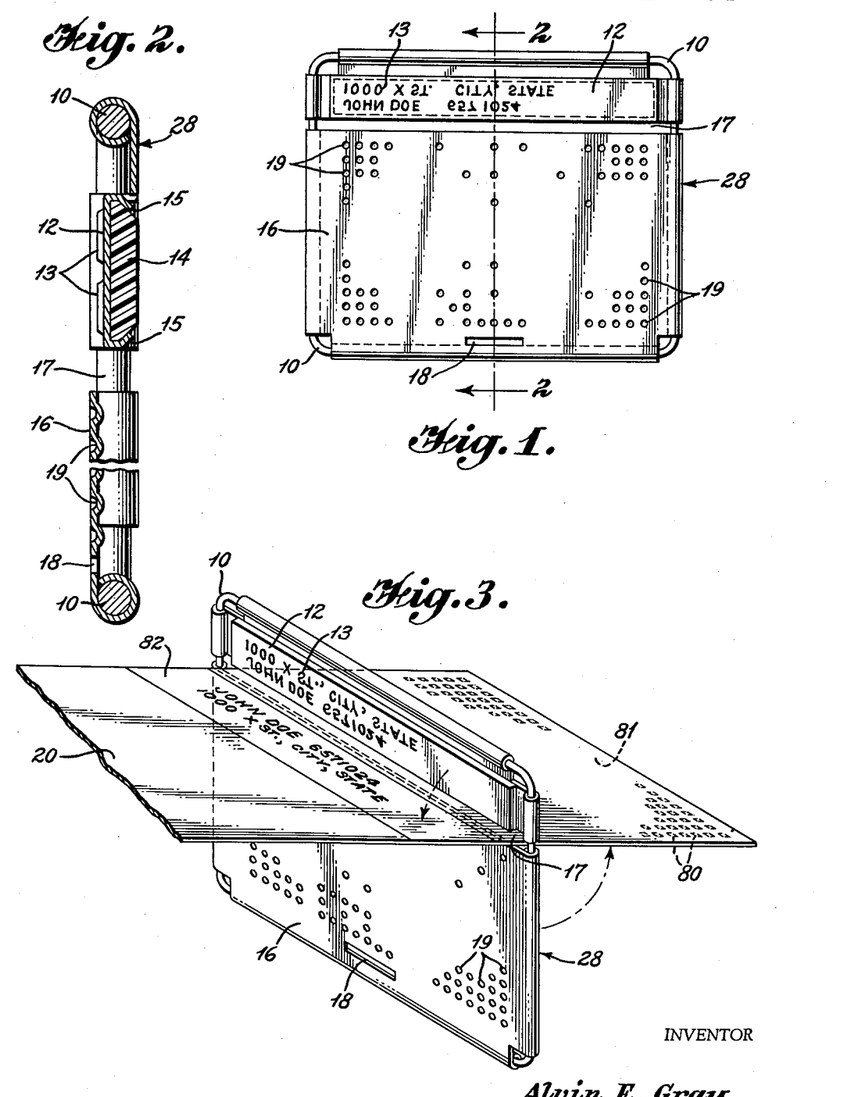
FIG. 1 is a plan view of a customer identification plate in accordance with one embodiment of the invention.
FIG. 2 is an enlarged cross section of the customer identification plate taken along the line 2—2 of FIG. 1.
FIG. 3 is a perspective view of the identification plate and a magnetic unit document showing their relative position within the machine made in accordance with the invention, prior to operation of the machine.

A preferred embodiment of a customer identification plate 28 shown in FIGS. 1–3 comprises a wire frame 10 in the form of a rectangular loop. A plate 12 containing the customer's name, address and account number in raised characters 13 is attached to the frame 10 at three places. The plate 12 has a backing strip 14 of plastic or light metal secured by bent ears 15. The identification plate also has a shield 16 of magnetizable material formed around the frame 10. The two plates 12 and 16 are position on the frame 10 in such a manner as to leave a slot 17 across the width of the identification plate.

In the preferred embodiment of the customer identification plate, a plurality of indentations 19 are formed in the shield 16. These indentations 19 are brought into accurate registration with premagnetized spots 80 on the magnetic unit document 20. The hole 18 in the shield 16 of the identification plate, in cooperation with sensing means of a machine to be more fully described later, insure the accurate registration of the indentations 19 with the premagnetized spots 80.

FIG. 3 shows the relative position within the originating machine of the customer identification plate and the magnetic unit document 20 before operation of the machine. The customer identification plate is inserted in a vertical position and the magnetic unit document 20 is inserted horizontally through the slot 17, with the premagnetized spots 80 face down. Operation of the machine, to be explained more fully, rocks the customer identification plate on an axis through the slot 17, in a counterclockwise direction, bringing the raised characters 13 above the magnetic unit document in position to print in visually readable characters in the field 82 of the magnetic unit document 20. The indentations 19 are brought into registration with the magnetic spots 80 in the field 81 of the magnetic unit document 20 on the opposite side of the document 20 from field 82. (See FIG. 8.) The application of a magnetic field below the shield 16 will cause erasure of the premagnetized spots where there is registration of an indentation 19 with a premagnetized spot. Erasure of the premagnetized spots 80 will not take place where there is an air gap 83 between the shield 16 and the card 20 (see FIG. 8). When the operation is completed, the premagnetized spots which have not been erased represent the customer identification data in an accounting machine readable code.

The illustrative embodiment of the machine which forms a part of this invention shown in FIGS. 4–7 consist of a base 73, side walls 74 and a rear cover 75. A portion 74a of the side walls 74 are bent over to a horizontal position (see FIG. 7). The two portions 74a of the side walls form an opening beneath which is attached a writing bed 70. Over the opening is placed a framework 76 which constitutes a card receiver. The framework 76 has a raised portion 30 over a bent in portion 74b of the front side wall.

Figure 4:
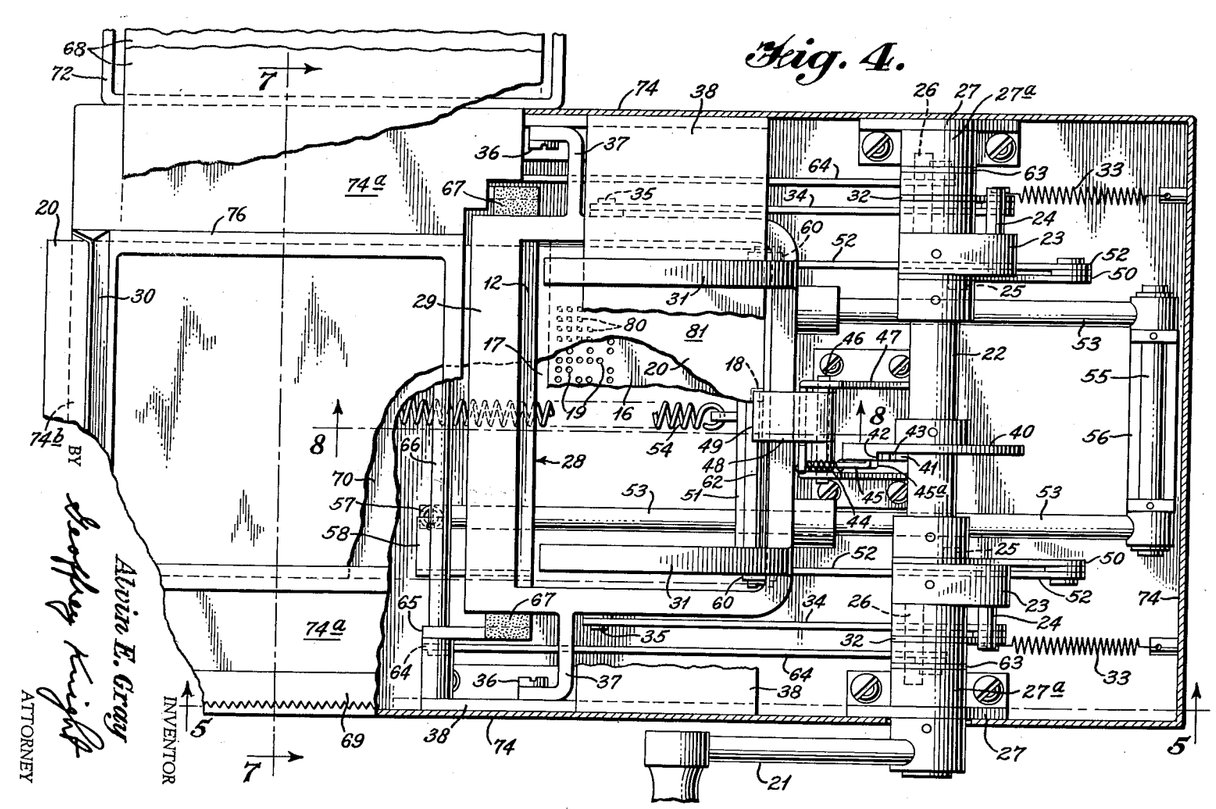
FIG. 4 is a plan view of the machine in an operated position with the rear cover removed and portions broken away.
Figure 5:
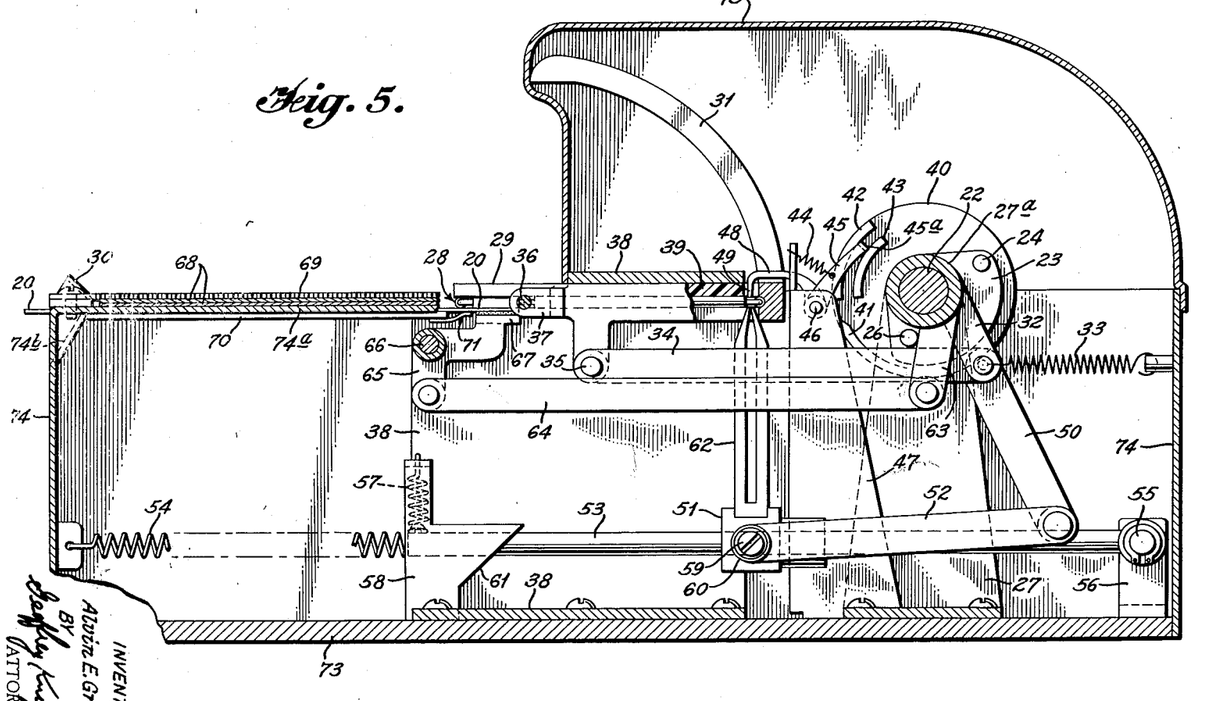
FIG. 5 is a longitudinal section of the machine in an operated position taken along the line 5—5 of FIG. 4.
Figure 7:
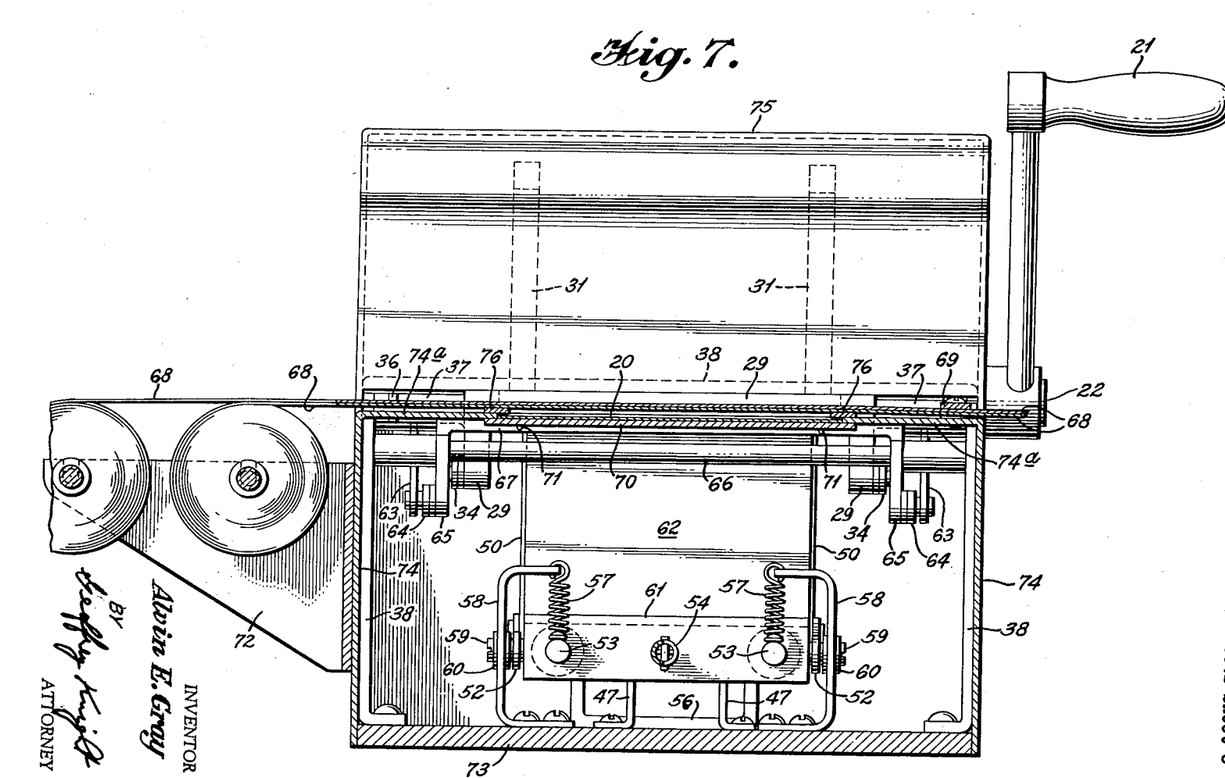
FIG. 7 is a cross section of the machine in an operated position taken along the line 7—7 of FIG. 4.

Mounted within the box like structure is a support member 38. The member 38 is mounted on the base 73 and extends up the sides 74 along the central portion of the side 74 (FIG. 5 and FIG. 7). A portion of the support member 38 extends across the width of the box like structure to form an arch, (FIG. 4 and FIG. 7).

The support member 38 provides a support for a shaft 66 which extends across the machine. The shaft 66 in turn supports a printing platen 67 which extends across a major portion of the machine.

Figure 9:
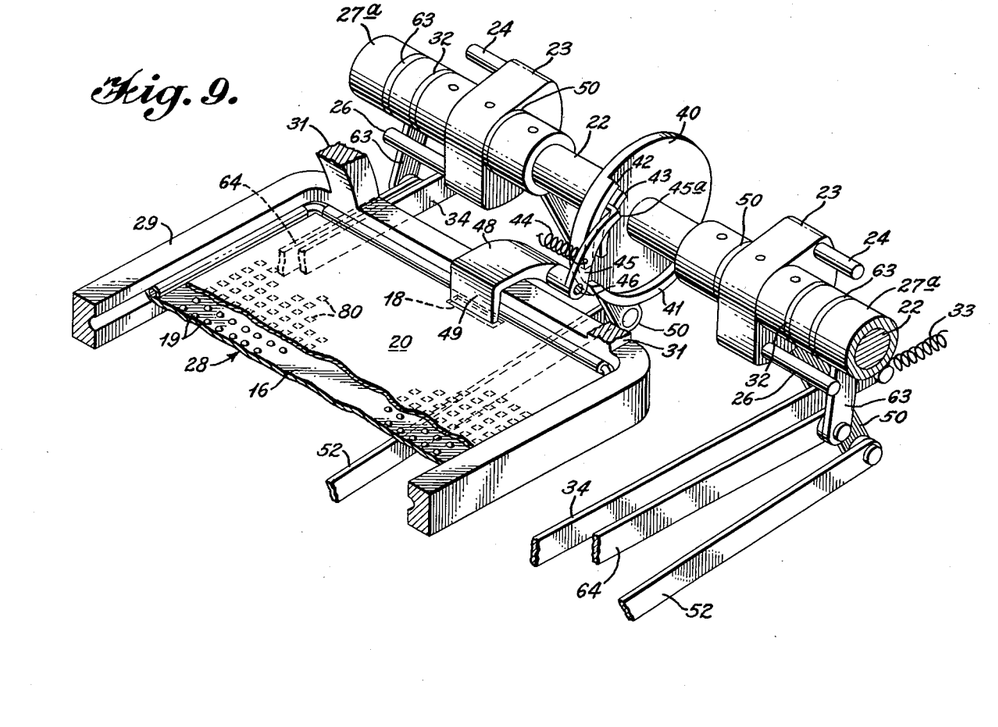
FIG. 9 is an enlarged perspective view of a portion of the magnetic unit document, the customer identification plate, and a portion of the operating mechanism of the machine made in accordance with the invention.

Also mounted in the support member 38 is a bearing 36 which supports, through arms 37, a customer identification plate holder 29. The identification plate holder 29 is in the form of a lower U-shaped portion with grooved inner walls adapted to receive a customer identification plate (FIG. 9). The upper portion of the identification plate holder 29 (FIG. 6) serves as a backing for the portion of the identification plate 12 which contains the raised characters 13. Attached to and carried by the identification plate holder 29 are two curved card stops 31 which aid in accurately positioning a magnetic unit document within the machine before operation.

A permanent magnet 62 (FIGS. 5 and 6) carried by the magnet support 51 is slidably mounted on two shafts 53. The magnet 62 and support 51 are urged to the left by the action of spring 54 and upward by the action of springs 57. Springs 57 are attached to the shafts 53 and the supports 58. The opposite ends 55 of shafts 53 are pivotally mounted on support 56. The supports 58 have a cam surface 61 which provides a camming surface for a pair of cam rollers 60 carried by pins 59 attached to the magnet support 51. The magnet 62, in the unoperated position, is depressed away from the printing platen 67 by the action of the spring 54 and the cam rollers 60 riding on the cam surfaces 61 of the supports 58. (See FIG. 6.)

Referring to FIGS. 4–7 and FIG. 9, the operating means for the originating machine is shown to include a shaft 22 upon which is pinned a handle 21. Also pinned to shaft 22 are two sectors 23 each of which carries three pins, 24, 25 and 26. The shaft 22 of the operating means is journalled in bearings 27a of a support 27. Also pinned to the shaft 22 is a disc 40 which has a concentric camming surface 41 and two stops 42 and 43. In the unoperated position (see FIG. 6) a cam lever 45 with a bent over end 45a (see also FIG. 9) is urged against the cam 41 by a spring 44. The cam lever 45 is pinned to a shaft 46 mounted in a bracket 47 fastened to the base. Also pinned to the shaft 46 is a feeler lever 48 with a bent over end 49. The end 49 of the feeler 48 will be just slightly above the card 20 before operation of the machine. (See FIG. 8.)

The remaining parts of the document originating machine will be identified in connection with a complete sequence of operation.

Figure 6:
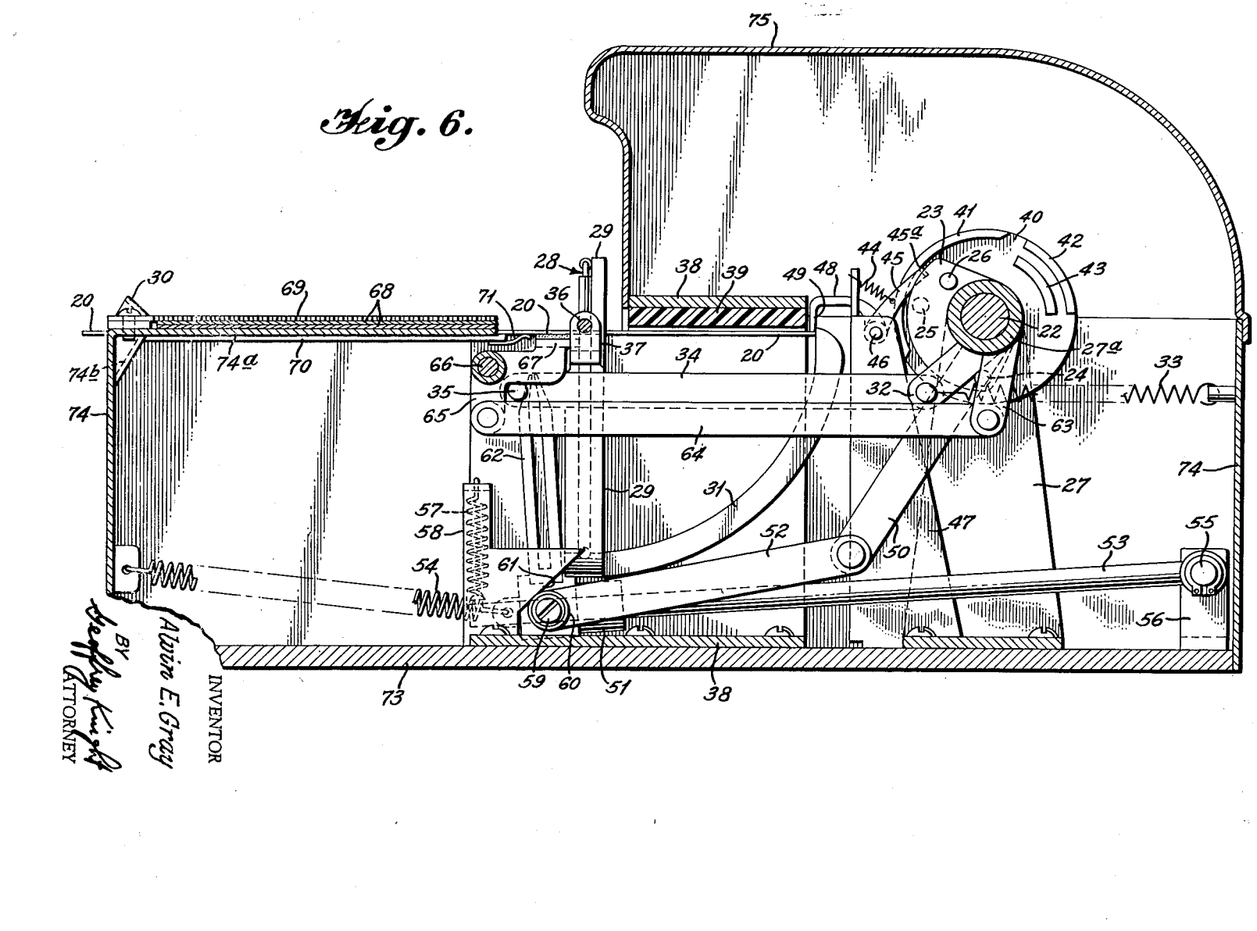
FIG. 6 is a longitudinal section of the machine in an unoperated position taken along the same line as FIG. 5.

Referring to FIG. 6, the customer identification plate, noted generally by the numeral 28, is inserted into the identification plate holder 29 which is in a vertical position. The magnetic unit document 20 is inserted horizontally into the receiver 30 between the writing bed 70 and the receiver frame 76 (FIGS. 4 and 7) with the premagnetized spots 80 down, until it abutts the curved card stops 31. The bent up wires 71 attached beneath the writing bed 70 insure that the document 20 will ride over the printing platen 67 upon insertion.

Mounted freely on the shaft 22 are two arms 32 urged in a counterclockwise direction by springs 33. The arms 32, while in the unoperated position are prevented from counterclockwise movement by pins 24. Pivotally mounted to the ends of arms 32 are links 34 which in turn are pivotally mounted to lugs 35 on either side of the plate receiver 29.

The operation of the originating machine commences as the handle 21 is pulled to turn shaft 22 in a counterclockwise direction from the position seen in FIG. 6. As this is done, the pins 24 move away from the arms 32 and the springs 33 pull the arms 32 in a counterclockwise direction. Through movement of the arms 32 and the links 34, the plate receiver 29 is rotated in a counterclockwise direction about the bearings 36. Rotation of the plate receiver 29 is on an axis through the slot 17 in the identification plate 28. The plate receiver 29 and the identification plate 28 rotate until the shield 16 of the identification plate 28 abuts the plastic or light metal stop 39 mounted beneath the support 38. The identification plate 28 and receiver 29 are now in the position shown in FIGS. 4, 5 and 7–9. The raised characters 13 of the identification plate 28 are now above the upper side of the card 20 and the shield 16 is against the lower side of the card 20. (See FIG. 8 and FIG. 9).

Figure 8:
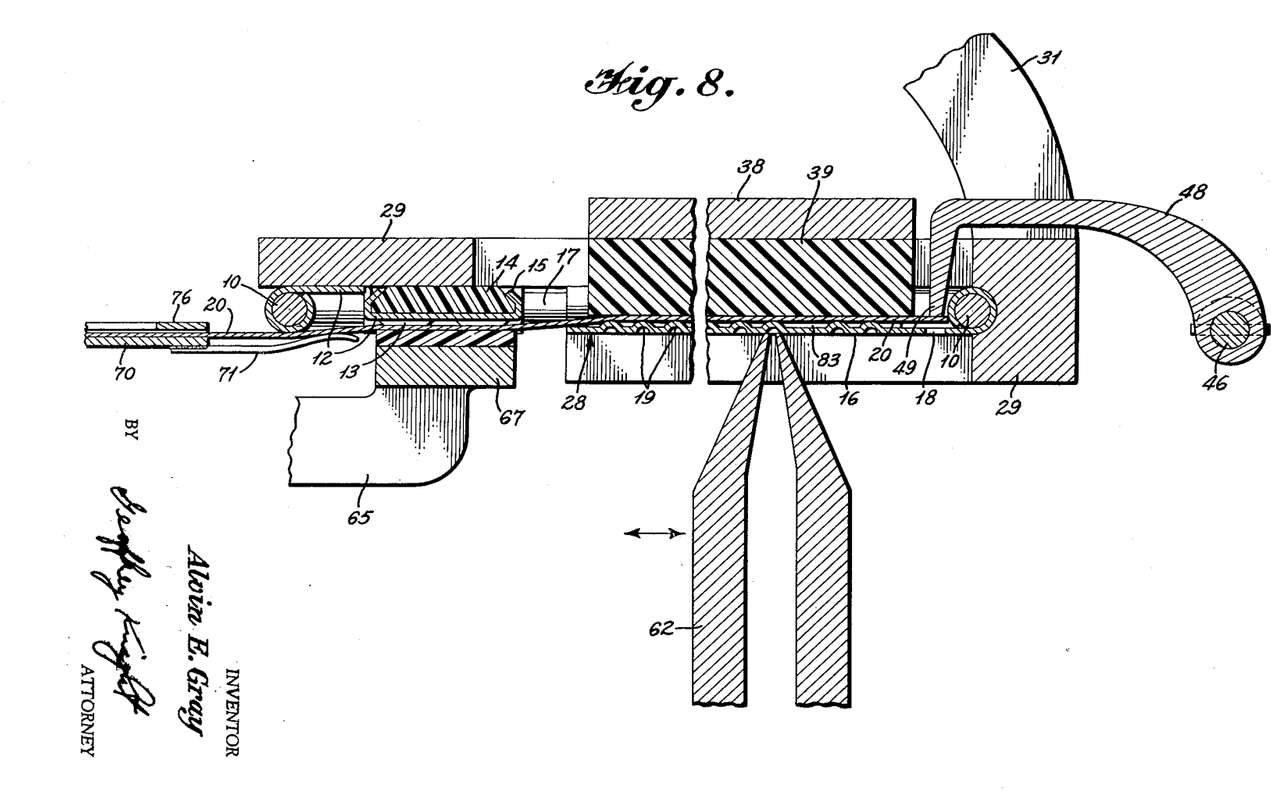
FIG. 8 is an enlarged longitudinal section taken along the line 8—8 of FIG. 4.

Referring to FIG. 8 and FIG. 9, when the plate receiver 29 has reached its horizontal position, the cam lever end 45a will be between the cam 41 and the stops 42 and 43, and the knife edge end 49 of the feeler 48 will attempt to pass through the narrow slot 18 in the shield 16 of the plate 28, but will be restrained if the card 20 and the plate 28 are in proper registration. With the card 20 and plate 28 in proper registration, the two stops 42 and 43 will straddle the end 45a of the lever 45 and the shaft 22 will continue to rotate. However, if the card 20 is not in position, the end 49 of the feeler 48 will pass through the slot 18 urged by the spring 44, allowing the cam lever 45 to rotate counterclockwise so the stop 42 will contact the end 45a of the lever 45 and prevent further movement of the shaft 22. If the identification plate is not seated properly in the receiver 29 the feeler 48 will be rotated clockwise when the receiver 29 swings up to the horizontal position, carrying the lever end 45a into the path of the stop 43, thereby stopping further rotation of shaft 22. The operator of the machine is therefore warned of any mis-registration of the identification plate shield 16 with the premagnetized spots 80 of the magnetic unit document 20.

If the card and plate are both in place, rotation of the shaft continues. The pins 24 move away from the arms 32. Pins 25 contact arms 50 freely mounted on shaft 22, and start rotating them counterclockwise. The links 52 connecting the arms 50 and the magnet support 51 will slide the frame 51 on the shafts 53 to the right. Movement away from cam surfaces 61 will permit the springs 57 to raise the shafts 53 and the magnet frame 51 until the upper ends of the magnet 62 contact the magnetic shield 16. (See FIGS. 5, 7 and 8). Further movement of the arms 50 will slide the magnet 62 across the magnetic shield 16 erasing the premagnetized marks 80 on the card 20 wherever there is an indentation 19 on the shield 16. The machine readable code will be the premagnetized spots 80 which have not been erased as a result of failure of magnetic flux to cross the air gap 83 where there is no indentation 19. (See FIG. 8.)

Just previous to the extreme movement of the shaft 22, the pins 26 in the sectors 23 will contact the arms 63 and cause them to rotate counterclockwise. Pivoted to the arms 63 are links 64 which in turn are pivoted to the arms 65 of the platen 67 which rotate on the shaft 66. A very small movement of the arms 63 is sufficient to strike the platen 67 against the card 20 to cause printing of the raised characters.

In order to provide printing on the top of the card 20, and to provide a station receipt and a customer receipt of the transaction, carbon back paper forms may be used. When using roll forms, the paper 68, supported by bracket 72, is placed over the card receiver frame 76 and under a tear off strip 69 (FIGS. 4 and 7). In this case the paper may be placed in position above the card receiver framework 76 before inserting the card 20. The top form should have a tear off strip of caron to cause printing of the raised characters on the top form. Manual entry of the type and amount of the transaction may now be made on the forms 68 and card 20 upon the writing bed 70.

Returning the handle 21 to its original position restores the mechanism. The platen 67 is released, spring 54 attached to the magnet frame 51 causes the frame 51 to move to the left along the shafts 53 to its starting position shown in FIG. 6. Returning the handle 21 to its original position forces pins 24 against arms 32 to overcome the force of the springs 33 and rotates the plate receiver 29 to its vertical position. The magnetic unit document and identification plate may now be removed.

While the invention has been particularly shown and described with reference to a preferred embodiment thereof, it will be understood by those skilled in the art that various changes in form and details may be made therein without departing from the spirit and scope of the invention.

I claim:

1. In a device for generating magnetic unit documents pertaining to transactions of a plurality of customers on cards having initially a complete array of premagnetized spots, by selective demagnetization of said spots in accordance with a code under control of an identification plate having a magnetic shield; a machine comprising means to receive and hold an identification plate, means to guide a record card into said machine in proximity to the plate so held, means to bring the plate and the record card face to face in registration for control of the selective demagnetization, and means for applying a magnetic field to selected ones of the premagnetized spots of the record card under control of the identification plate.

2. In a device for generating magnetic unit documents pertaining to transactions of a plurality of customers on cards having initially a complete array of premagnetized spots thereon under control of a customer identification plate containing a section of raised printing characters and a section of coded information, the two sections being separated to form a slot across the plate; a rotatable identification plate support, document positioning means adapted to position the document within the device relative to the identification plate, means for rotating said support to present the printing characters above the tabulating card and the coded information contiguous with the premagnetized spots, operating means, means including a magnet activated by said operating means for applying a magnetic field to selected ones of the premagnetized spots in accordance with the coded information on the identification plate, and means including a printing platen activated by said operating means to strike the document to cause the raised printing characters to print.

3. A device in accordance with claim 2 including sensing means associated with said operating means to prevent rotation of said operating means after rotation of said plate support if the plate and document are not in accurate registration.

4. A device in accordance with claim 2 including a pair of stops carried by said operating means, and sensing means in cooperative association with said stops to prevent rotation of said operating means after rotation of said plate support if the plate and document are not in accurate registration.

5. In a device for generating magnetic unit documents pertaining to transactions of a plurality of customers on cards having initially a complete array of premagnetized spots thereon under control of a customer identification plate containing a section of raised printing characters and a section of coded information in the form of a magnetic shield, the two sections being separated to form a slot across the plate; an identification plate support mounted within the device to pivot on an axis through the slot in the plate, document positioning means including a writing bed and card stop attached to said plate support adapted to position the tabulating card through the slot in the plate substantially perpendicular to the plane of the plate, rotatable operating means, means including a spring released by rotation of said operating means to rotate said plate support to present the raised printing characters and the section of coded information to opposite faces of the tabulating card, a magnet, means including linkage between said magnet and said operating means activated by further rotation of said operating means to cause said magnet to travel contiguously across the section of coded information on the identification plate for applying a magnetic field to certain of the premagnetized spots on the document in accordance with the coded information on the identification plate, a pivotally mounted printing platen, and printing means including linkage between said platen and said operating means activated by further rotation of said operating means to strike said platen against the document to cause printing of the raised characters.

6. An identification plate for imprinting type letters on and coding a record having initially a complete array of premagnetized spots by selective erasure of the spots under control of the identification plate comprising a section of raised printing characters, and a section of discrete locations in a code pattern, at least said last-mentioned section being made of magnetizable material.

7. An identification plate for transferring data from said plate to a record, comprising:
a frame;
a pair of flat sections, having first and second sides and being attached to said frame in substantially the same plane but separated to form a slot between the adjacent edges of said sections so that a record can be inserted in said slot, one of said flat sections having data manifestations on said first side and the other of said flat sections having data manifestations on said second side, whereby the data manifestations of said flat sections are brought into contact with said record when the plate, and a record inserted thru said slot, are moved into approximately parallel positions.

8. An identification plate comprising a wire frame, a printing plate containing raised printing characters attached to said frame, and a shield containing coded information attached to said frame in substantially the same plane but separated from said printing plate.

9. An identification plate in accordance with claim 8 wherein said shield is made of magnetizable material.

10. An identification plate for insertion in a sales recording machine comprising a wire frame having a rectangular shape, a printing plate containing raised printing characters attached to said frame on three sides, a shield attached to said frame on two sides in common with said printing plate and a fourth side, and a plurality of discrete locations on said shield representing coded information, said printing plate and shield being in substantially the same plane but separated to form an opening between them across said frame.

11. In a device for generating magnetic unit documents from data processing cards having, on at least a portion of their area, an array of premagnetized spots, an identification plate comprising two flat sections separated by a slot extending across the plate, the slot being long enough to permit one of the data processing cards to be inserted through it, one of said sections having legible character printing means thereon, the other one of said sections having an array of spaced magnetically permeable elements thereon in a coded configuration representing identifying insignia, said elements being relatively disposed so that, if one of said cards is placed with its array of premagnetized spots facing said array of elements, said elements will coincide with certain corresponding ones of said spots respectively; a rotatable identification plate support; means for positioning one of the data processing cards in the slot of said identification plate when the latter is held by said support; means for rotating said support to present said printing means to one portion of the card in said slot and concurrently to bring said magnetically permeable elements into contiguity with the respective corresponding ones of the premagnetized spots of said card; operating means; means activated by said operating means for projecting a magnetic field through said magnetical permeable elements to erase the premagnetized spots respectively contiguous to said magnetically permeable elements; and additional means activated by said operating means for taking a printed impression from said printed means on said card.

12. The device described in claim 11 additionally including sensing means associated with said positioning means to indicate whether or not the plate and cards are in accurate registration, and means responsive to said sensing means for preventing a complete actuation of said operating means if the plate and card are not in accurate registration.

13. In a device for generating magnetic unit documents from data processing cards having, on at least a portion of their area, an array of premagnetized spots, an identification plate comprising two flat sections separated by a slot extending across the plate, the slot being long enough to permit one of the data processing cards to be inserted through it, one of said sections having legible character printing means thereon, the other one of said sections having an array of spaced magnetically permeable elements thereon in a coded configuration representing identifying insignia, said elements being relatively disposed so that, if one of said cards is placed with its array of premagnetized spots facing said array of elements, said elements will coincide with certain corresponding ones of said spots, respectively; an identification plate support mounted within the device to pivot on an axis through the slot in the plate; document positioning means including a writing bed and card stop attached to said plate support adapted to position the card through the slot in the plate substantially perpendicular to the plane of the plate; rotatable operating means; means including a spring released by rotation of said operating means to rotate said plate support to present the raised printing characters and the section of coded information to opposite faces of the tabulating card; a magnet; means including linkage between said magnet and said operating means activated by further rotation of said operating means to cause said magnet to travel contiguously across the section of coded information on the identification plate for applying a magnetic field through said permeable elements to certain of the premagnetized spots on the document in accordance with the coded information on the identification plate; a pivotally mounted printing platen; and printing means including linkage between said platen and said operating means activated by further rotation of said operating means to strike said platen against the documents to cause printing of the raised characters.

14. An identification plate for transferring to a card information in the form of printed legible characters and coded information, comprising: two flat sections separated by a slot long enough to permit one of the cards to be inserted therethrough, one of said sections having means, operative when the plate and card inserted through its slot are moved into approximately parallel position, to print legible characters on one portion of the card, the other one of said sections having coded information transfer means effective at another portion of the card.

15. An identification plate comprising a section of raised printing characters and a magnetic shielding section, the shielding section having a configuration representing identifying information in accordance with a selected data designation code, the two sections being at opposite ends of the plate and separated by a slot transversely across the plate.

References Cited in the file of this patent

UNITED STATES PATENTS

| | | |
|---|---|---|
| 2,359,617 | Bryce | Oct. 3, 1944 |
| 2,363,096 | Sullivan | Nov. 21, 1944 |
| 2,520,077 | Wolowitz | Aug. 22, 1950 |
| 2,704,187 | Beach et al. | Mar. 15, 1955 |
| 2,856,256 | Carman et al. | Oct. 14, 1958 |